United States Patent
Du

(10) Patent No.: US 9,565,423 B2
(45) Date of Patent: Feb. 7, 2017

(54) DISPLAY PANEL AND IMAGE DISPLAYING METHOD THEREOF

(71) Applicant: SHENZHEN CHINA STAR OPTOELECTRONICS TECHNOLOGY CO., LTD., Shenzhen, Guangdong (CN)

(72) Inventor: Peng Du, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 276 days.

(21) Appl. No.: 14/387,748

(22) PCT Filed: Jul. 5, 2014

(86) PCT No.: PCT/CN2014/081710
§ 371 (c)(1),
(2) Date: Sep. 24, 2014

(87) PCT Pub. No.: WO2015/196510
PCT Pub. Date: Dec. 30, 2015

(65) Prior Publication Data
US 2016/0255339 A1  Sep. 1, 2016

(30) Foreign Application Priority Data
Jun. 25, 2014  (CN) .......................... 2014 1 0293050

(51) Int. Cl.
*H04N 13/04* (2006.01)
*G09G 3/20* (2006.01)
*G09G 3/00* (2006.01)

(52) U.S. Cl.
CPC .......... *H04N 13/0454* (2013.01); *G09G 3/003* (2013.01); *G09G 3/20* (2013.01);
(Continued)

(58) Field of Classification Search
CPC ........................ G09G 3/003; G09G 2320/0209
See application file for complete search history.

(56) References Cited

U.S. PATENT DOCUMENTS

2012/0320173 A1    12/2012   Kim et al.
2013/0141481 A1*   6/2013   Peng ................. G02F 1/134309
                                                                 345/694
(Continued)

FOREIGN PATENT DOCUMENTS

CN    102830559 A    12/2012
CN    102866549 A    1/2013
(Continued)

*Primary Examiner* — Larry Sternbane
*Assistant Examiner* — Maheen Javed
(74) *Attorney, Agent, or Firm* — Ladas & Parry LLP

(57) ABSTRACT

The present invention discloses a display panel, which comprises a pixel array panel and a control circuit. In the pixel array panel, at least two pixels are arranged in a matrix form along a second direction. A first white sub-pixel and a second white sub-pixel in the pixel are arranged along a first direction. At least one of red sub-pixel, green sub-pixel, and blue sub-pixel exists between the first white sub-pixel and the second white sub-pixel. The display panel of the present invention can avoid crosstalk occurred when a stereoscopic image is displayed.

12 Claims, 7 Drawing Sheets

(52) U.S. Cl.
CPC ....... *G09G 3/2003* (2013.01); *H04N 13/0422* (2013.01); *H04N 13/0434* (2013.01); *H04N 13/0452* (2013.01); *H04N 13/0486* (2013.01); *H04N 13/0497* (2013.01); *G09G 2300/0443* (2013.01); *G09G 2300/0452* (2013.01); *G09G 2320/0209* (2013.01)

(56) References Cited

U.S. PATENT DOCUMENTS

| | | | |
|---|---|---|---|
| 2013/0155056 A1* | 6/2013 | Chen | G09G 5/026 345/419 |
| 2014/0078186 A1 | 3/2014 | Chen et al. | |
| 2014/0232757 A1* | 8/2014 | Nakahata | G09G 3/2003 345/690 |

FOREIGN PATENT DOCUMENTS

| | | |
|---|---|---|
| CN | 102625132 A | 8/2013 |
| JP | 2013-182149 A | 9/2013 |
| KR | 20120029859 A | 3/2012 |

\* cited by examiner

DISPLAY PANEL AND IMAGE DISPLAYING METHOD THEREOF

BACKGROUND OF THE INVENTION

1. Field of the Invention

The present invention relates to display technology, and more particularly, to a display panel and an image displaying method thereof.

2. Description of Prior Art

A technical scheme to display stereoscopic images in traditional display panels is that odd rows of pixels and even rows of pixels respectively display a left-eye image and a right-eye image in an alternative manner.

In practice, the inventor(s) found that the conventional skills exist at least the following problems. In order to reduce crosstalk occurred when the stereoscopic images are displayed, a block matrix (BM) having a much wider width is usually needed. The block matrix located between rows of pixels in the traditional display panel is utilized to block light rays. However, this may reduce the transmittance of the display panel.

Therefore, it is necessary to provide a new technical scheme for solving above technical problems.

SUMMARY OF THE INVENTION

The objective of the present invention is to provide a display panel and an image displaying method thereof, which are capable of making the display panel have a higher transmittance and avoiding crosstalk when a stereoscopic image is displayed.

To solve above problems, the present invention provides following technical schemes.

The present invention provides a display panel, comprising: a pixel array panel, which comprises: at least two pixel rows arranged in a matrix along a first direction, the first direction being perpendicular to a second direction, the second direction being parallel to a straight line the pixel row aligned with, the pixel row comprising: at least two pixels arranged in a matrix along the second direction, said pixel comprising: a red sub-pixel; a green sub-pixel; a blue sub-pixel; a first white sub-pixel; and a second white sub-pixel; wherein the first white sub-pixel and the second white sub-pixel are arranged along the first direction, and at least one of the red sub-pixel, the green sub-pixel, and the blue sub-pixel exists between the first white sub-pixel and the second white sub-pixel; the display panel further comprising: a control circuit connected to the pixel array panel, for transmitting scan signals and data signals to the pixels so as to control the pixels to display a to-be-displayed image, the control circuit further receiving control signals and based on the control signals, the control circuit switching a display mode of the display panel to a two-dimensional image display mode or a stereoscopic image display mode; the control circuit comprising a scan driving circuit, a data driving circuit, and a clock signal generating circuit; the first white sub-pixel being located at a margin of the pixel in the first direction; the pixel row comprising: a sub-pixel set row comprising at least two sub-pixel sets, the sub-pixel set comprising the red sub-pixel, the green sub-pixel, the blue sub-pixel, and the second white sub-pixel; and a first white sub-pixel row comprising at least two said first white sub-pixels; wherein the first white sub-pixel row and the sub-pixel set row are arranged along the first direction and are arranged side by side; wherein when the display panel is in the stereoscopic image display mode, the control circuit controls each of the first white sub-pixels in the first white sub-pixel row to be in a turn-off state, and controls the sub-pixel set row to display a stereoscopic image.

In the afore-described display panel, in a period corresponding to two successive image frames, the control circuit controls two adjacent sub-pixel set rows respectively to display a left-eye image and a right-eye image.

In the afore-described display panel, when the display panel is in the two-dimensional image display mode, the control circuit controls each of the first white sub-pixels in the first white sub-pixel row to be in a turn-on state, and controls the sub-pixel set row and the first white sub-pixel row to display a two-dimensional image.

In the afore-described display panel, the red sub-pixel, the green sub-pixel, the blue sub-pixel, and the second white sub-pixel are all arranged along the first direction and are arranged side by side; the red sub-pixel, the green sub-pixel, and the blue sub-pixel are all located between the first white sub-pixel and the second white sub-pixel.

In the afore-described display panel, said pixel further comprises a third white sub-pixel; the red sub-pixel, the green sub-pixel, the blue sub-pixel, the second white sub-pixel, and the third white sub-pixel are all arranged along the first direction and are arranged side by side; the second white sub-pixel is located between any two of the red sub-pixel, the green sub-pixel, and the blue sub-pixel; the third white sub-pixel is located between any two of the red sub-pixel, the green sub-pixel, and the blue sub-pixel.

In the afore-described display panel, the red sub-pixel, the green sub-pixel, and the blue sub-pixel are arranged with the first white sub-pixel, the second white sub-pixel, and the third white sub-pixel alternatively.

In the afore-described display panel, said pixel further comprises a fourth white sub-pixel; the first white sub-pixel and the fourth white sub-pixel are arranged along the second direction and are arranged side by side; the first white sub-pixel, the second white sub-pixel, and one of the red sub-pixel, the green sub-pixel, and the blue sub-pixel are arranged along the first direction and are arranged side by side; the fourth white sub-pixel and the other two of the red sub-pixel, the green sub-pixel, and the blue sub-pixel are arranged along the first direction and are arranged side by side.

In the afore-described display panel, the red sub-pixel, the green sub-pixel, the blue sub-pixel, and the second white sub-pixel construct the sub-pixel set, the sub-pixel set and the first white sub-pixel are arranged along the first direction and are arranged side by side, the sub-pixel set and the second white sub-pixel are arranged along the first direction and are arranged side by side.

In another aspect, the present invention provides a display panel, comprising: a pixel array panel, which comprises: at least two pixel rows arranged in a matrix along a first direction, the first direction being perpendicular to a second direction, the second direction being parallel to a straight line the pixel row aligned with, the pixel row comprising: at least two pixels arranged in a matrix along the second direction, said pixel comprising: a red sub-pixel; a green sub-pixel; a blue sub-pixel; a first white sub-pixel; and a second white sub-pixel; wherein the first white sub-pixel and the second white sub-pixel are arranged along the first direction, and at least one of the red sub-pixel, the green sub-pixel, and the blue sub-pixel exists between the first white sub-pixel and the second white sub-pixel; the display panel further comprising: a control circuit connected to the pixel array panel, for transmitting scan signals and data signals to the pixels so as to control the pixels to display a to-be-displayed image, the control circuit further receiving control signals and based on the control signals, the control circuit switching a display mode of the display panel to a two-dimensional image display mode or a stereoscopic image display mode.

In the afore-described display panel, the first white sub-pixel being located at a margin of the pixel in the first direction; the pixel row comprising: a sub-pixel set row comprising at least two sub-pixel sets, the sub-pixel set comprising the red sub-pixel, the green sub-pixel, the blue sub-pixel, and the second white sub-pixel; and a first white sub-pixel row comprising at least two said first white sub-pixels; wherein the first white sub-pixel row and the sub-pixel set row are arranged along the first direction and are arranged side by side.

In the afore-described display panel, when the display panel is in the stereoscopic image display mode, the control circuit controls each of the first white sub-pixels in the first white sub-pixel row to be in a turn-off state, and controls the sub-pixel set row to display a stereoscopic image.

In the afore-described display panel, in a period corresponding to two successive image frames, the control circuit controls two adjacent sub-pixel set rows respectively to display a left-eye image and a right-eye image.

In the afore-described display panel, when the display panel is in the two-dimensional image display mode, the control circuit controls each of the first white sub-pixels in the first white sub-pixel row to be in a turn-on state, and controls the sub-pixel set row and the first white sub-pixel row to display a two-dimensional image.

In the afore-described display panel, the red sub-pixel, the green sub-pixel, the blue sub-pixel, and the second white sub-pixel are all arranged along the first direction and are arranged side by side; the red sub-pixel, the green sub-pixel, and the blue sub-pixel are all located between the first white sub-pixel and the second white sub-pixel.

In the afore-described display panel, said pixel further comprises a third white sub-pixel; the red sub-pixel, the green sub-pixel, the blue sub-pixel, the second white sub-pixel, and the third white sub-pixel are all arranged along the first direction and are arranged side by side; the second white sub-pixel is located between any two of the red sub-pixel, the green sub-pixel, and the blue sub-pixel; the third white sub-pixel is located between any two of the red sub-pixel, the green sub-pixel, and the blue sub-pixel.

In the afore-described display panel, the red sub-pixel, the green sub-pixel, and the blue sub-pixel are arranged with the first white sub-pixel, the second white sub-pixel, and the third white sub-pixel alternatively.

In the afore-described display panel, said pixel further comprises a fourth white sub-pixel; the first white sub-pixel and the fourth white sub-pixel are arranged along the second direction and are arranged side by side; the first white sub-pixel, the second white sub-pixel, and one of the red sub-pixel, the green sub-pixel, and the blue sub-pixel are arranged along the first direction and are arranged side by side; the fourth white sub-pixel and the other two of the red sub-pixel, the green sub-pixel, and the blue sub-pixel are arranged along the first direction and are arranged side by side.

In the afore-described display panel, the red sub-pixel, the green sub-pixel, the blue sub-pixel, and the second white sub-pixel construct the sub-pixel set, the sub-pixel set and the first white sub-pixel are arranged along the first direction and are arranged side by side, the sub-pixel set and the second white sub-pixel are arranged along the first direction and are arranged side by side.

In another aspect, the present invention provides an image displaying method for the afore-described display panel, said method comprising steps of: the control circuit receiving the control signals; according to the control signals, the control circuit switching the display mode of the display panel to the two-dimensional image display mode or the stereoscopic image display mode; when the display panel is in the stereoscopic image display mode, the control circuit controls each of the first white sub-pixels in the first white sub-pixel row to be in a turn-off state, and controls the sub-pixel set row to display a stereoscopic image; and when the display panel is in the two-dimensional image display mode, the control circuit controls each of the first white sub-pixels in the first white sub-pixel row to be in a turn-on state, and controls the sub-pixel set row and the first white sub-pixel row to display a two-dimensional image.

In the image displaying method for the afore-described display panel, said method further comprises: in a period corresponding to two successive image frames, the control circuit controls two adjacent sub-pixel set rows respectively to display a left-eye image and a right-eye image when the display panel is in the stereoscopic image display mode.

Compared to conventional skills, the present invention can effectively reduce crosstalk strength and probability occurred when the display panel is in the stereoscopic image display mode. Also, the black matrix in the display panel does not need to have a wide width. Therefore, the transmittance of the display panel can be maintained at a higher level.

To make above content of the present invention more easily understood, it will be described in details by using preferred embodiments in conjunction with the appending drawings.

DETAILED DESCRIPTION OF THE PREFERRED EMBODIMENTS

The following descriptions for the respective embodiments are specific embodiments capable of being implemented for illustrations of the present invention with referring to appended figures.

Figure 1:
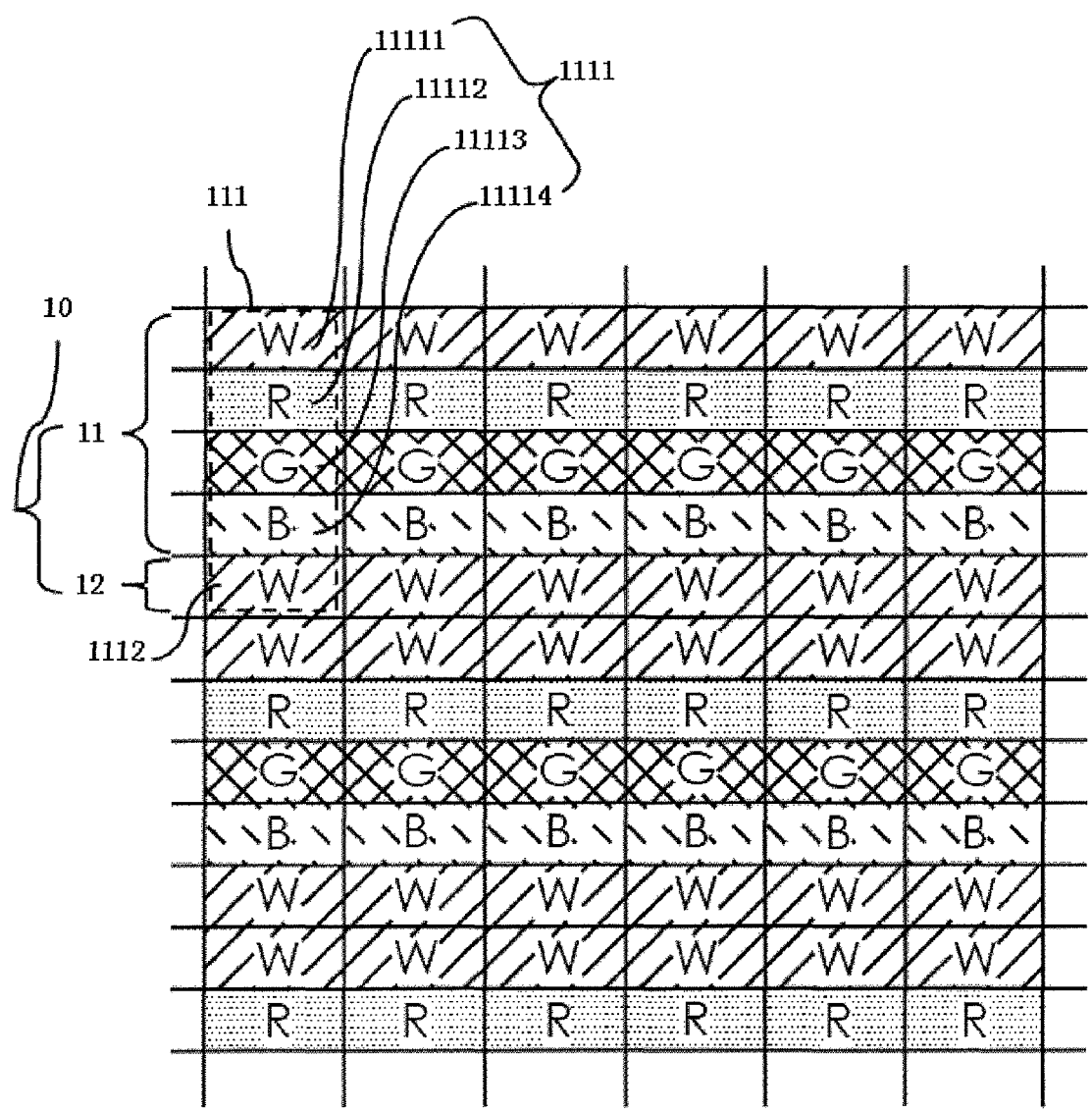
FIG. 1 is a schematic diagram showing a display panel in accordance with a first embodiment of the present invention in a two-dimensional image display mode.
Figure 2:
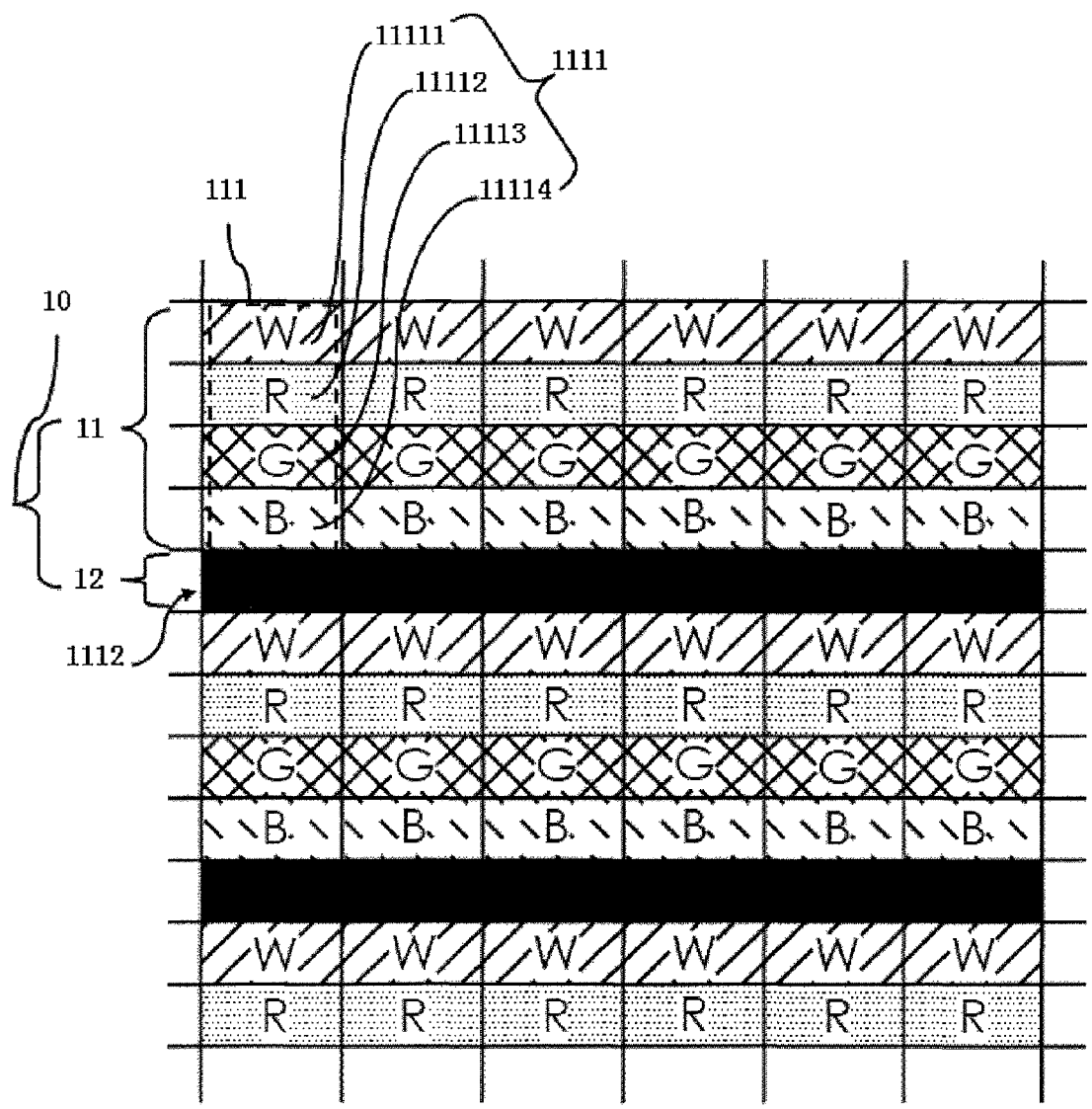
FIG. 2 is a schematic diagram showing a display panel in accordance with a first embodiment of the present invention in a stereoscopic image display mode.

Please refer to FIG. 1 and FIG. 2. FIG. 1 and FIG. 2 are schematic diagrams showing a display panel in accordance with a first embodiment of the present invention respectively in a two-dimensional image display mode and in a stereoscopic image display mode.

The display panel of the present embodiment comprises a pixel array panel and a control circuit. The control circuit is connected to the pixel array panel. The control circuit is utilized to transmit scan signals and data signals to the pixels 111 so as to control the pixels 111 to display a to-be-displayed image. The control circuit comprises a scan driving circuit, a data driving circuit, and a clock signal generating circuit. The clock signal generating circuit is utilized to generate clock signals. The scan driving circuit generates the scan signals according to the clock signals and transmits the scan signals to the pixels 111 of the pixel array panel. Based on the clock signals, the data driving circuit transmits to the pixel array panel the data signals corresponding to the to-be-displayed image. The control circuit further receives control signals and based on the control signals, the control circuit determines whether to switch the display mode of the display panel to a two-dimensional image display mode or a stereoscopic image display mode. The control circuit further switches the display mode of the display panel to the two-dimensional image display mode or the stereoscopic image display mode, based on the control signals.

The pixel array panel comprises at least two pixel rows 10 arranged in a matrix along a first direction. The first direction is perpendicular to a second direction. The second direction is parallel to a straight line the pixel row 10 aligned with. That is, the first direction is perpendicular to the straight line the pixel row 10 aligned with. The pixel row 10 comprises at least two pixels 111 arranged in a matrix along the second direction. The pixel 111 comprises a red sub-pixel 11112, a green sub-pixel 11113, a blue sub-pixel 11114, a first white sub-pixel 1112, and a second white sub-pixel 11111.

Amongst, the first white sub-pixel 1112 and the second white sub-pixel 11111 are arranged along the first direction, and at least one of the red sub-pixel 11112, the green sub-pixel 11113, and the blue sub-pixel 11114 exists between the first white sub-pixel 1112 and the second white sub-pixel 11111.

The first white sub-pixel 1112 is located at a margin of the pixel 111 in the first direction. That is, the position where the first white sub-pixel 1112 locates in the pixel 111 belongs to the margin. The first white sub-pixel 1112 is adjacent to another pixel row 10. The pixel row 10 comprises a sub-pixel set row 11 and a first white sub-pixel row 12. The sub-pixel set row 11 comprises at least two sub-pixel sets 1111. The at least two sub-pixel sets 1111 are arranged in a matrix form along the second direction to construct the sub-pixel set row 11. The sub-pixel set 1111 comprises the red sub-pixel 11112, the green sub-pixel 11113, the blue sub-pixel 11114, and the second white sub-pixel 11111. The sub-pixel set 1111 is adjacent to the first white sub-pixel 1112. The first white sub-pixel row 12 comprises at least two first white sub-pixels 1112. The at least two first white sub-pixels 1112 are arranged along the second direction to construct the first white sub-pixel row 12. The first white sub-pixel row 12 and the sub-pixel set row 11 are arranged along the first direction and are arranged side by side. That is, the first white sub-pixel row 12 is adjacent to the sub-pixel set row 11.

In the present embodiment, the red sub-pixel 11112, the green sub-pixel 11113, the blue sub-pixel 11114, and the second white sub-pixel 11111 are all arranged along the first direction and are arranged side by side. The red sub-pixel 11112, the green sub-pixel 11113, and the blue sub-pixel 11114 are all located between the first white sub-pixel 1112 and the second white sub-pixel 11111.

When the display panel is in the stereoscopic image display mode, the control circuit controls each of the first white sub-pixels 1112 in the first white sub-pixel row 12 to be in a turn-off state, and controls the sub-pixel set row 11 to display a stereoscopic image. Meanwhile, each of the first white sub-pixels 1112 in the first white sub-pixel row 12 is in a black state. The first white sub-pixel row 12 has a function of blocking light rays when the display panel is in the stereoscopic image display mode. The first white sub-pixel row 12 functions as a black matrix.

In a period corresponding to two successive image frames, the control circuit controls two adjacent sub-pixel set rows 11 respectively to display a left-eye image and a right-eye image when the display panel is in the stereoscopic image display mode.

By the afore-described technical scheme, crosstalk strength and probability occurred when the display panel is in the stereoscopic image display mode can be effectively reduced.

When the display panel is in the two-dimensional image display mode, the control circuit controls each of the first white sub-pixels 1112 in the first white sub-pixel row 12 to be in a turn-on state, and controls the sub-pixel set row 11 and the first white sub-pixel row 12 to display a two-dimensional image.

By the afore-described technical scheme, the black matrix in the display panel does not need to have a wide width. Therefore, the transmittance of the display panel can be maintained at a higher level. That is, the transmittance of the display panel in the two-dimensional image display mode is not sacrificed.

Figure 3:
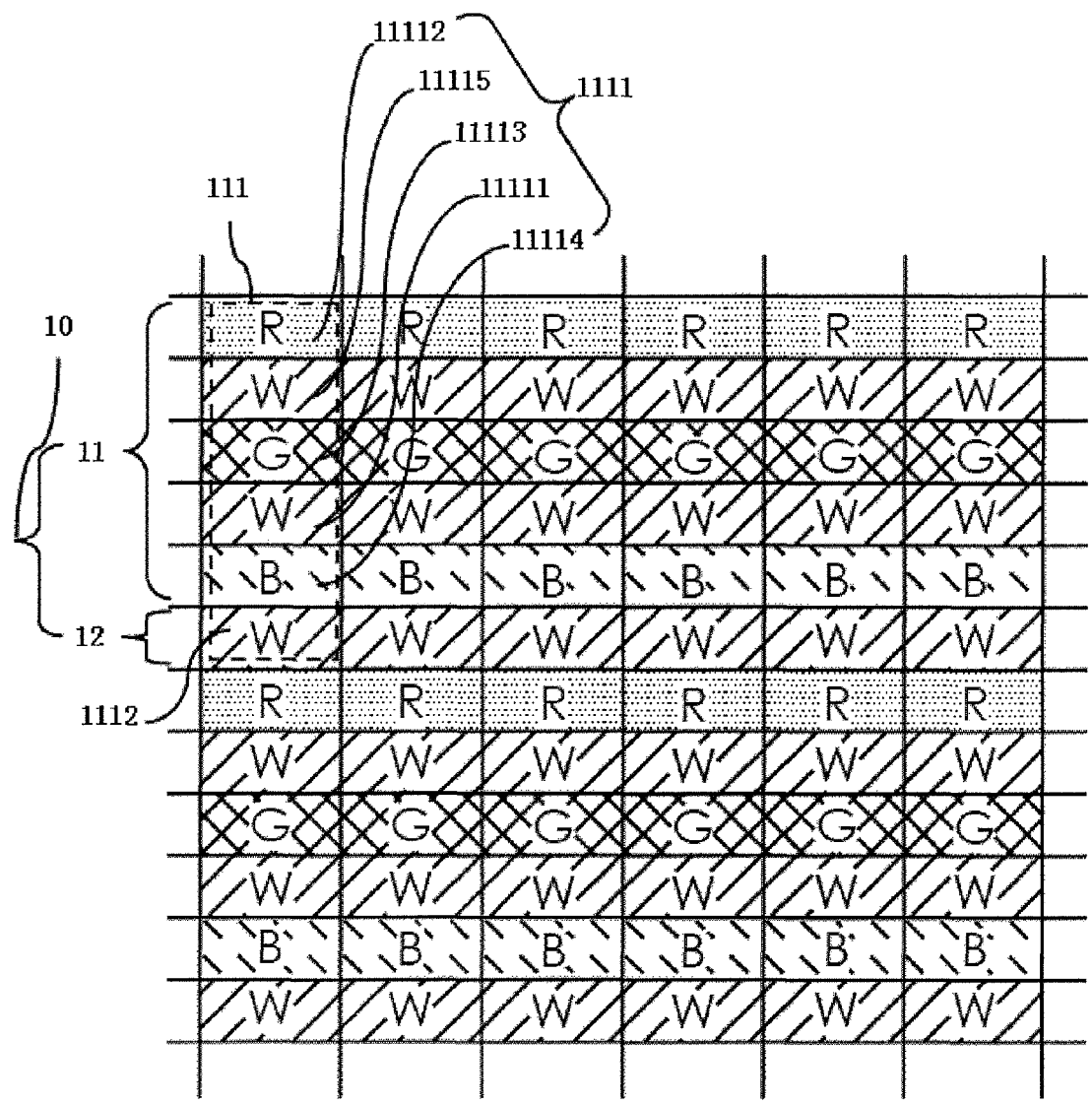
FIG. 3 is a schematic diagram showing a display panel in accordance with a second embodiment of the present invention in a two-dimensional image display mode.
Figure 4:
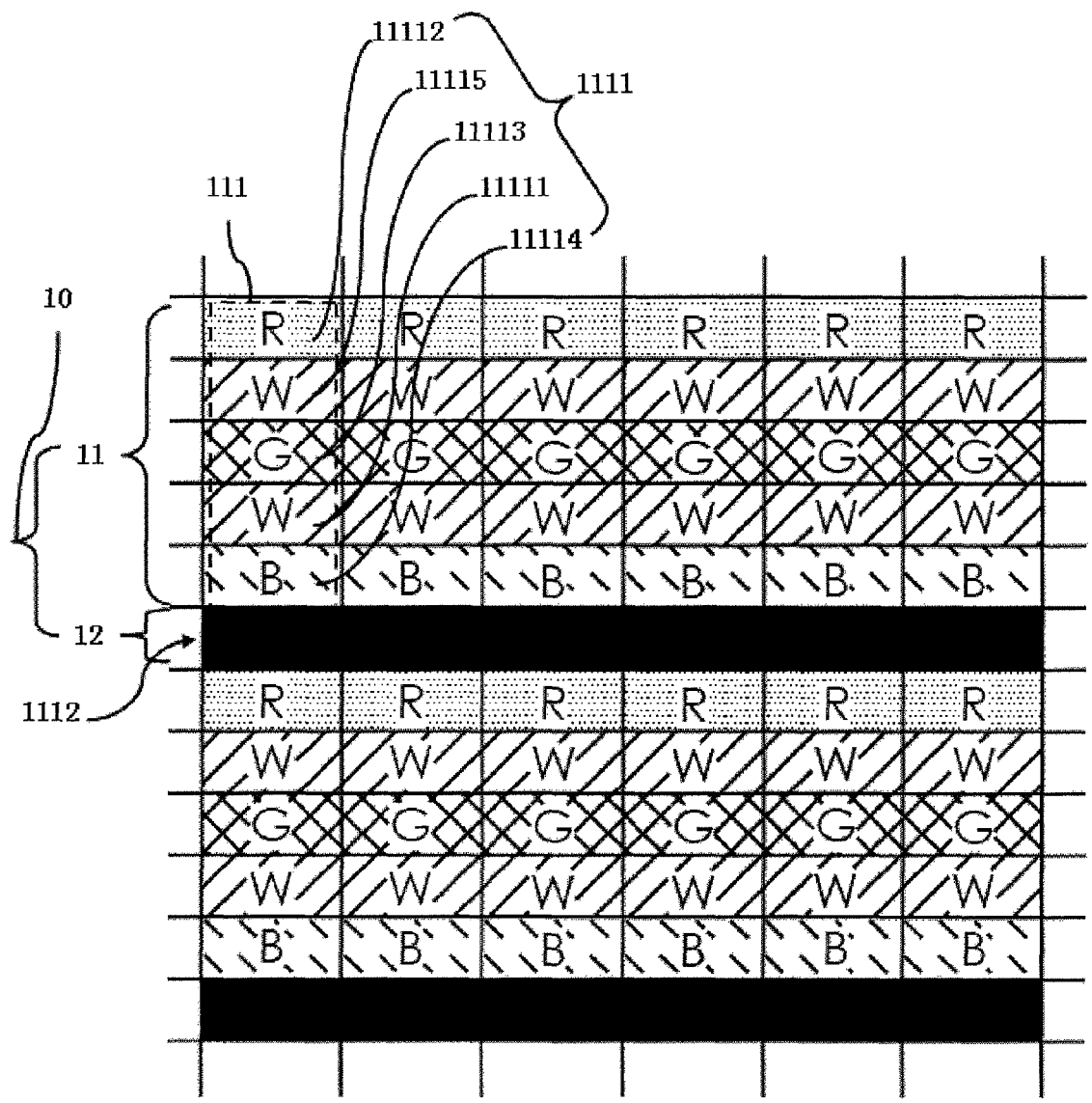
FIG. 4 is a schematic diagram showing a display panel in accordance with a second embodiment of the present invention in a stereoscopic image display mode.

Please refer to FIG. 3 and FIG. 4. FIG. 3 and FIG. 4 are schematic diagrams showing a display panel in accordance with a second embodiment of the present invention respectively in a two-dimensional image display mode and in a stereoscopic image display mode. The present embodiment is similar to the first embodiment. The differences therebetween are described below.

In the present embodiment, the pixel 111 further comprises a third white sub-pixel 11115. The red sub-pixel 11112, the green sub-pixel 11113, the blue sub-pixel 11114, the second white sub-pixel 11111, and the third white sub-pixel 11115 are all arranged along the first direction and are arranged side by side. The red sub-pixel 11112, the green sub-pixel 11113, the blue sub-pixel 11114, the second white sub-pixel 11111, and the third white sub-pixel 11115 constructs the sub-pixel set 1111.

The second white sub-pixel 11111 is located between any two of the red sub-pixel 11112, the green sub-pixel 11113, and the blue sub-pixel 11114.

The third white sub-pixel 11115 is located between any two of the red sub-pixel 11112, the green sub-pixel 11113, and the blue sub-pixel 11114.

That is to say, the red sub-pixel 11112, the green sub-pixel 11113, and the blue sub-pixel 11114 are arranged with the first white sub-pixel 1112, the second white sub-pixel 11111, and the third white sub-pixel 11115 alternatively.

Figure 5:
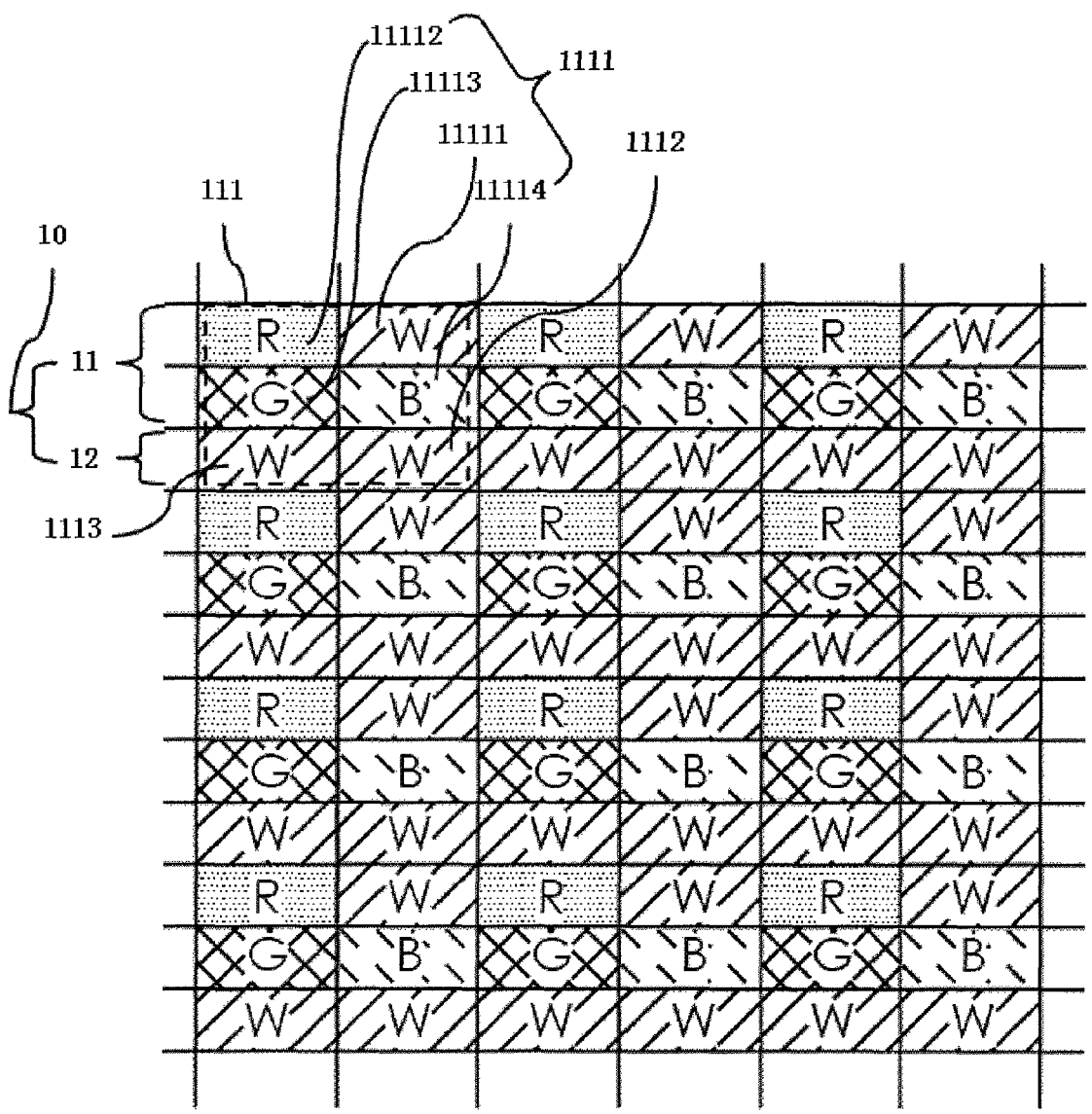
FIG. 5 is a schematic diagram showing a display panel in accordance with a third embodiment of the present invention in a two-dimensional image display mode.
Figure 6:
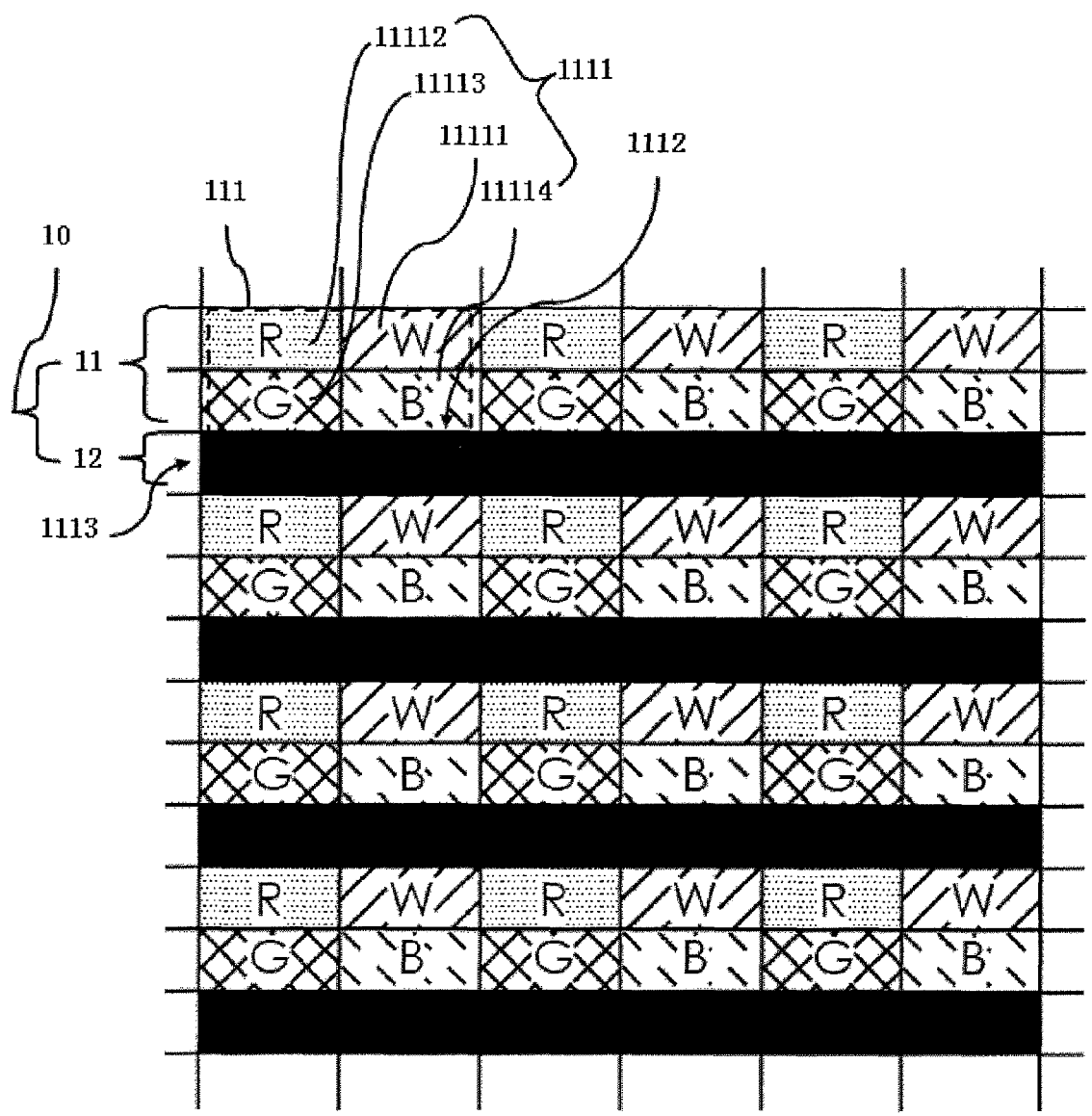
FIG. 6 is a schematic diagram showing a display panel in accordance with a third embodiment of the present invention in a stereoscopic image display mode.

Please refer to FIG. 5 and FIG. 6. FIG. 5 and FIG. 6 are schematic diagrams showing a display panel in accordance with a third embodiment of the present invention respectively in a two-dimensional image display mode and in a stereoscopic image display mode. The present embodiment is similar to the first embodiment or the second embodiment. The differences therebetween are described below.

In the present embodiment, the pixel 111 further comprises a fourth white sub-pixel 1113. The first white sub-pixel 1112 and the fourth white sub-pixel 1113 are arranged along the second direction and are arranged side by side.

The first white sub-pixel 1112, the second white sub-pixel 11111, and one of the red sub-pixel 11112, the green sub-pixel 11113, and the blue sub-pixel 11114 are arranged along the first direction and are arranged side by side.

The fourth white sub-pixel 1113 and the other two of the red sub-pixel 11112, the green sub-pixel 11113, and the blue sub-pixel 11114 are arranged along the first direction and are arranged side by side.

That is to say, the red sub-pixel 11112, the green sub-pixel 11113, the blue sub-pixel 11114, the first white sub-pixel 1112, the second white sub-pixel 11111, and the fourth white sub-pixel 1113 are arranged along the first direction and the second direction. The red sub-pixel 11112, the green sub-pixel 11113, the blue sub-pixel 11114, and the second white sub-pixel 11111 construct the sub-pixel set 1111. The sub-pixel set 1111 and the first white sub-pixel 1112 are arranged along the first direction and are arranged side by side. The sub-pixel set 1111 and the second white sub-pixel 11111 are arranged along the first direction and are arranged side by side.

Figure 7:
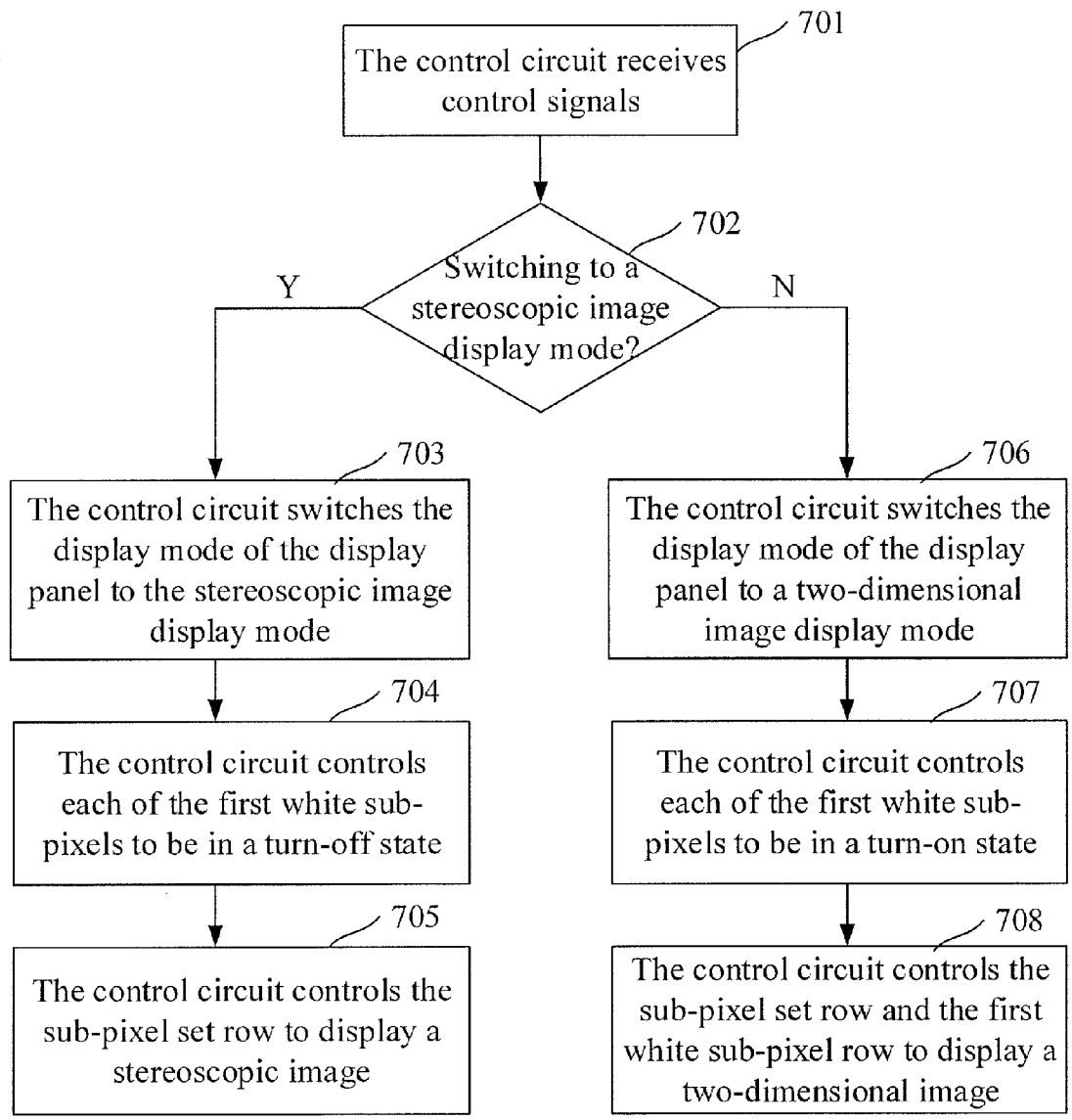
FIG. 7 is a flow char of a first embodiment of an image displaying method for a display panel in accordance with the present invention.

Please refer to FIG. 7. FIG. 7 is a flow char of a first embodiment of an image displaying method for a display panel in accordance with the present invention.

The image displaying method for the display panel in the present embodiment comprises following steps.

In Step 701, the control circuit receives control signals.

In Step 702, based on the control signals, the control circuit determines whether to switch the display mode of the display panel to a two-dimensional image display mode or a stereoscopic image display mode. If it is determined to switch to the stereoscopic image display mode, go to Step S703. Otherwise, go to Step 706.

In Step S703, the control circuit switches the display mode of the display panel to the stereoscopic image display mode based on the control signals.

In Step S704, when the display panel is in the stereoscopic image display mode, the control circuit controls each of the first white sub-pixels 1112 in the first white sub-pixel row 12 to be in a turn-off state.

In Step S705, the control circuit controls the sub-pixel set row 11 to display a stereoscopic image. In a period corresponding to two successive image frames, the control circuit controls two adjacent sub-pixel set rows 11 respectively to display a left-eye image and a right-eye image when the display panel is in the stereoscopic image display mode.

In Step S706, the control circuit switches the display mode of the display panel to the two-dimensional image display mode based on the control signals.

In Step S707, when the display panel is in the two-dimensional image display mode, the control circuit controls each of the first white sub-pixels 1112 in the first white sub-pixel row 12 to be in a turn-on state.

In Step S708, the control circuit controls the sub-pixel set row 11 and the first white sub-pixel row 12 to display a two-dimensional image.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A display panel, comprising: a pixel array panel, which comprises:
    at least two pixel rows arranged in a matrix along a first direction, the first direction being perpendicular to a second direction, the pixel row comprising:
    at least two pixels arranged in a matrix along the second direction, said pixel comprising:
    a red sub-pixel; a green sub-pixel; a blue sub-pixel; a first white sub-pixel; a second white sub-pixel; a third white sub-pixel; and
    wherein the first white sub-pixel and the second white sub-pixel are arranged along the first direction, and at least one of the red sub-pixel, the green sub-pixel, and the blue sub-pixel exists between the first white sub-pixel and the second white sub-pixel;
    the display panel further comprising:
    a control circuit connected to the pixel array panel, for transmitting scan signals and data signals to the pixels so as to control the pixels to display a to-be-displayed image, the control circuit further receiving control signals and based on the control signals, the control circuit switching a display mode of the display panel to a two-dimensional image display mode or a stereoscopic image display mode;
    the control circuit comprising a scan driving circuit, a data driving circuit, and a dock signal generating circuit;
    the first white sub-pixel being located at a margin of the pixel in the first direction; the pixel row comprising:
    a sub-pixel set row comprising at least two sub-pixel sets, the sub-pixel set comprising the red sub-pixel, the green sub-pixel, the blue sub-pixel, the second white sub-pixel, and the third sub-pixel; and
    a first white sub-pixel row comprising at least two said first white sub-pixels; wherein
    the first white sub-pixel row and the sub-pixel set row are arranged side by side along the first direction
    wherein when the display panel is in the stereoscopic image display mode, the control circuit controls each of the first white sub-pixels in the first white sub-pixel row to be in a turn-off state, and controls the sub-pixel set row to display a stereoscopic image;
    the red sub-pixel, the green sub-pixel, the blue sub-pixel, the second white sub-pixel, and the third white sub-pixel are all arranged side by side along the first direction
    the second white sub-pixel is located between any two of the red sub-pixel, the green sub-pixel, and the blue sub-pixel;
    the third white sub-pixel is located between any two of the red sub-pixel, the green sub-pixel, and the blue sub-pixel.

2. The display panel according to claim 1, wherein in a period corresponding to two successive image frames, the control circuit controls two adjacent sub-pixel set rows respectively to display a left-eye image and a right-eye image.

3. The display panel according to claim 1, wherein when the display panel is in the two-dimensional image display mode, the control circuit controls each of the first white sub-pixels in the first white sub-pixel row to be in a turn-on state, and controls the sub-pixel set row and the first white sub-pixel row to display a two-dimensional image.

4. The display panel according to claim 1, wherein the red sub-pixel, the green sub-pixel, and the blue sub-pixel are arranged with the first white sub-pixel, the second white sub-pixel, and the third white sub-pixel alternatively.

5. A display panel, comprising:
a pixel array panel, which comprises:
at least two pixel rows arranged in a matrix along a first direction, the first direction being perpendicular to a second direction, the pixel row comprising:
at least two pixels arranged in a matrix along the second direction, said pixel comprising:
a red sub-pixel; a green sub-pixel; a blue sub-pixel; a first white sub-pixel a second white sub-pixel; a third white sub-pixel; and wherein
the first white sub-pixel and the second white sub-pixel are arranged along the first direction, and at least one of the red sub-pixel, the green sub-pixel, and the blue sub-pixel exists between the first white sub-pixel and the second white sub-pixel; the display panel further comprising:
a control circuit connected to the pixel array panel, for transmitting scan signals and data signals to the pixels so as to control the pixels to display a to-be-displayed image, the control circuit further receiving control signals and based on the control signals, the control circuit switching a display mode of the display panel to a two-dimensional image display mode or a stereoscopic image display mode;
the red sub-pixel, the green sub-pixel, the blue sub-pixel, the second white sub-pixel, and the third white sub-pixel are all arranged side by side along the first direction and are arranged side by side;
the second white sub-pixel is located between any two of the red sub-pixel, the green sub-pixel, and the blue sub-pixel;
the third white sub-pixel is located between any two of the red sub-pixel, the green sub-pixel, and the blue sub-pixel.

6. The display panel according to claim 5, wherein:
the first white sub-pixel being located at a margin of the pixel in the first direction;
the pixel row comprising:
a sub-pixel set row comprising at least two sub-pixel sets, the sub-pixel set comprising the red sub-pixel, the green sub-pixel, the blue sub-pixel the second white sub-pixel; the third white sub-pixel and
a first white sub-pixel row comprising at least two said first white sub-pixels;
wherein the first white sub-pixel row and the sub-pixel set row are arranged along the first direction and are arranged side by side.

7. The display panel according to claim 6, wherein when the display panel is in the stereoscopic image display mode, the control circuit controls each of the first white sub-pixels in the first white sub-pixel row to be in a turn-off state, and controls the sub-pixel set row to display a stereoscopic image.

8. The display panel according to claim 7, wherein in a period corresponding to two successive image frames, the control circuit controls two adjacent sub-pixel set rows respectively to display a left-eye image and a right-eye image.

9. The display panel according to claim 6, wherein when the display panel is in the two-dimensional image display mode, the control circuit controls each of the first white sub-pixels in the first white sub-pixel row to be in a turn-on state, and controls the sub-pixel set row and the first white sub-pixel row to display a two-dimensional image.

10. The display panel according to claim 6, wherein the red sub-pixel, the green sub-pixel, and the blue sub-pixel are arranged with the first white sub-pixel, the second white sub-pixel, and the third white sub-pixel alternatively.

11. An image displaying method for the display panel in accordance with claim 5, said method comprising steps of:
the control circuit receiving the control signals;
according to the control signals, the control circuit switching the display mode of the display panel to the two-dimensional image display mode or the stereoscopic image display mode;
when the display panel is in the stereoscopic image display mode, the control circuit controls each of the first white sub-pixels in the first white sub-pixel row to be in a turn-off state, and controls the sub-pixel set row to display a stereoscopic image; and
when the display panel is in the two-dimensional image display mode, the control circuit controls each of the first white sub-pixels in the first white sub-pixel row to be in a turn-on state, and controls the sub-pixel set row and the first white sub-pixel row to display a two-dimensional image.

12. The image displaying method according to claim 11, further comprising:
in a period corresponding to two successive image frames, the control circuit controls two adjacent sub-pixel set rows respectively to display a left-eye image and a right-eye image when the display panel is in the stereoscopic image display mode.

* * * * *